(12) United States Patent
Iwano

(10) Patent No.: US 10,518,502 B2
(45) Date of Patent: Dec. 31, 2019

(54) RESIN STRUCTURE

(71) Applicant: TOYOTA JIDOSHA KABUSHIKI KAISHA, Toyota-shi, Aichi-ken (JP)

(72) Inventor: Yoshihiro Iwano, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 27 days.

(21) Appl. No.: 16/046,398

(22) Filed: Jul. 26, 2018

(65) Prior Publication Data
US 2019/0039345 A1  Feb. 7, 2019

(30) Foreign Application Priority Data

Aug. 7, 2017  (JP) .................................. 2017-152638

(51) Int. Cl.
| | |
|---|---|
| *B32B 5/12* | (2006.01) |
| *B32B 5/02* | (2006.01) |
| *B32B 5/24* | (2006.01) |
| *B29C 70/22* | (2006.01) |
| *B29C 70/44* | (2006.01) |
| *B29C 70/54* | (2006.01) |
| *B32B 5/28* | (2006.01) |
| *B32B 3/14* | (2006.01) |
| *B29L 31/30* | (2006.01) |

(Continued)

(52) U.S. Cl.
CPC .............. *B32B 5/12* (2013.01); *B29C 70/222* (2013.01); *B29C 70/443* (2013.01); *B29C 70/545* (2013.01); *B32B 3/14* (2013.01); *B32B 5/02* (2013.01); *B32B 5/026* (2013.01); *B32B 5/245* (2013.01); *B32B 5/28* (2013.01); *B29K 2105/089* (2013.01); *B29K 2105/0836* (2013.01); *B29K 2307/04* (2013.01); *B29L 2031/3058* (2013.01); *B32B 5/142* (2013.01); *B32B 5/145* (2013.01); *B32B 2250/44* (2013.01); *B32B 2260/023* (2013.01); *B32B 2260/046* (2013.01); *B32B 2262/106* (2013.01); *B32B 2307/40* (2013.01); *B32B 2451/00* (2013.01); *B32B 2605/08* (2013.01); *B62D 29/04* (2013.01); *B62D 35/007* (2013.01)

(58) Field of Classification Search
CPC ........... B32B 5/12; B32B 5/142; B32B 5/145; B32B 5/226; B29L 2031/3058; B29C 70/222
See application file for complete search history.

(56) References Cited

FOREIGN PATENT DOCUMENTS

| JP | H05-38798 A | 2/1993 |
|---|---|---|
| JP | 2014-69390 A | 4/2014 |

*Primary Examiner* — Alexander S Thomas
(74) *Attorney, Agent, or Firm* — Oliff PLC

(57) ABSTRACT

A resin structure includes a first structural portion and a second structural portion. The first structural portion includes a characteristic design surface and structures an end portion at a side of the resin structure at which the characteristic design surface is disposed. An orientation direction of fibers in a first pattern portion of the first structural portion differs from an orientation direction of fibers in a second pattern portion. The second structural portion includes a region disposed at the opposite side of the first structural portion to the side at which the characteristic design surface is disposed. Fibers contained in the second structural portion differ in fiber width from the fibers contained in the first structural portion. A portion of the fibers contained in a region of the second structural portion superposed with the first structural portion are configured to be visible through the resin of the first structural portion.

3 Claims, 7 Drawing Sheets

(51) Int. Cl.
*B29K 307/04* (2006.01)
*B62D 29/04* (2006.01)
*B29K 105/08* (2006.01)
*B62D 35/00* (2006.01)
*B32B 5/14* (2006.01)

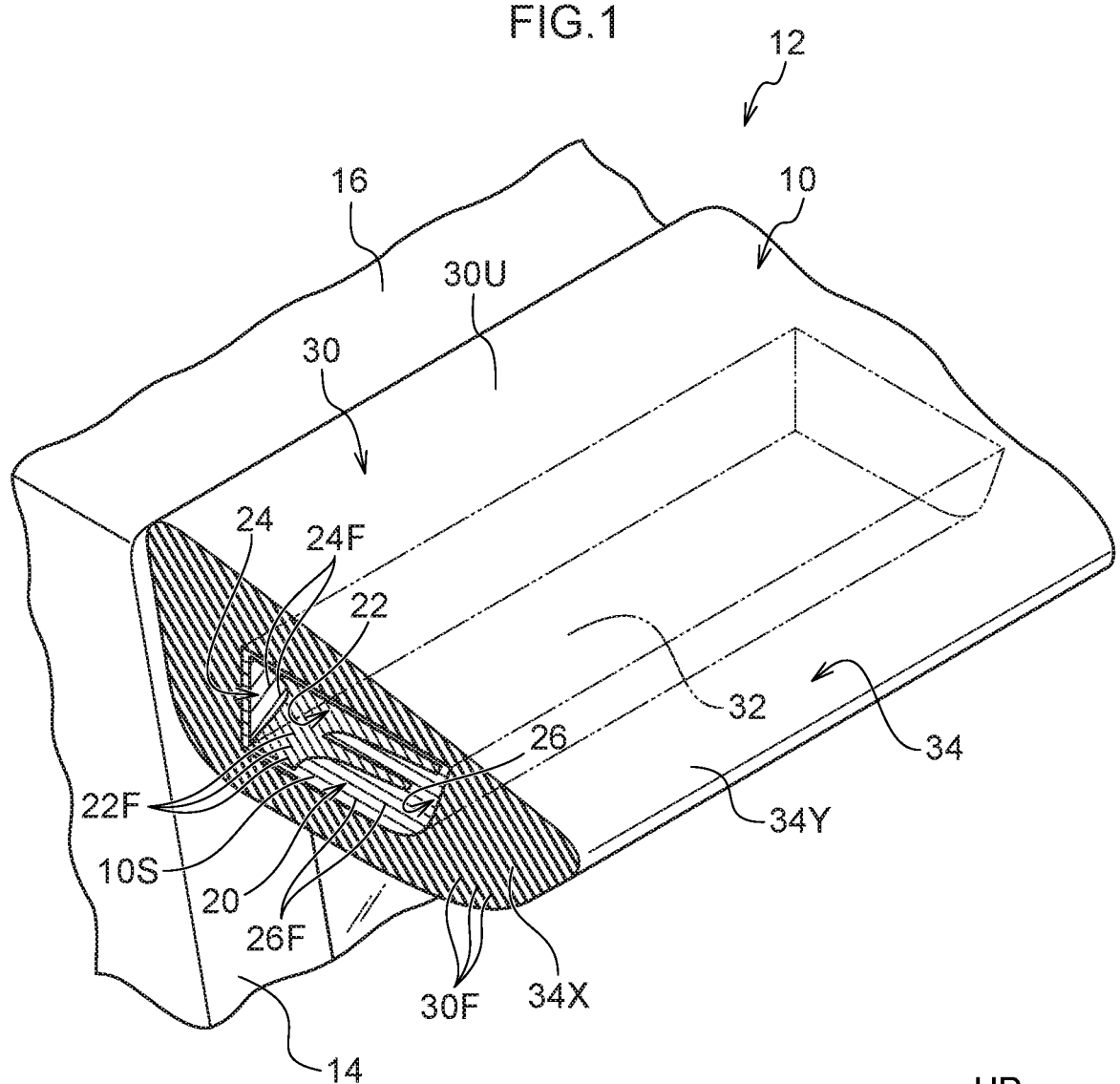
FIG.1
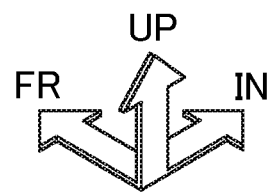

US 10,518,502 B2

RESIN STRUCTURE

CROSS-REFERENCE TO RELATED APPLICATION

This application is based on and claims priority under 35 USC 119 from Japanese Patent Application No. 2017-152638 filed on Aug. 7, 2017, the disclosure of which is incorporated by reference herein.

BACKGROUND

Technical Field

The present disclosure relates to a resin structure.

Related Art

Technologies are known that relate to resin structures containing fibers (see Japanese Patent Application Laid-Open (JP-A) Nos. 2014-69390 and H5-38798). For example, JP-A No. 2014-69390 discloses a technology relating to a laminated sheet in which a resin layer is laminated on a fibrous sheet. The laminated sheet features an embossed pattern of protrusions and indentations at a front face thereof.

However, in this technology, no consideration is given to utilizing the fibers in the laminated sheet to provide a sense of depth to the pattern as seen at a side at which a design surface is provided. There is scope for improvement in this regard.

SUMMARY

In consideration of the circumstances described above, the present disclosure provides a resin structure that may utilize fibers contained in a resin to provide a sense of depth to a pattern seen at a side at which a design surface is disposed.

An aspect of the present disclosure is a resin structure that includes: a first structural portion that includes a characteristic design surface and structures an end portion at a side of the resin structure at which the characteristic design surface is disposed, the characteristic design surface being provided in a predetermined region and differing in design from surroundings thereof; and a second structural portion that is provided integrally with the first structural portion and includes a region disposed at the opposite side of the first structural portion from the side thereof at which the characteristic design surface is disposed, wherein the first structural portion includes: a first pattern portion that structures a first pattern at a center side of the characteristic design surface and that is formed from a resin containing fibers that structure a portion of the first pattern as seen from a side facing the characteristic design surface and are oriented in a first direction; and a second pattern portion that structures a second pattern at an outer periphery side of the characteristic design surface and that is disposed at the outer periphery side of the first pattern portion, the second pattern portion being formed from a resin containing fibers that structure a portion of the second pattern as seen from the side facing the characteristic design surface and are oriented in a second direction different from the first direction, and the second structural portion is formed from a resin containing fibers with a different fiber width from the fibers contained in the first structural portion, a portion of the fibers contained in a region of the second structural portion that is superposed with the first structural portion being configured so as to be visible through the resin of the first structural portion.

The meaning of the term "fiber width" as used herein includes a maximum distance across a cross section orthogonal to a length direction of the fibers.

According to the structure described above, in the first structural portion that includes the characteristic design surface and structures the end portion at the side at which the characteristic design surface is disposed, the orientation direction of the fibers in the first pattern portion differs from the orientation direction of the fibers in the second pattern portion, and these fibers structure portions of the pattern. The fibers contained in the second structural portion, which includes the region disposed at the opposite side of the first structural portion from the side at which the characteristic design surface is disposed, differ in fiber width from the fibers contained in the first structural portion. The portion of the fibers contained in the region of the second structural portion that is superposed with the first structural portion are configured so as to be visible through the resin of the first structural portion. As a result, a sense of depth is provided to the pattern seen at the side at which the characteristic design surface is disposed.

In the above aspect, the fibers contained in the second structural portion may have a greater fiber width than the fibers contained in the first structural portion.

According to the structure described above, stiffness of the resin structure may be raised by the fibers contained in the second structural portion, while a finely detailed pattern is presented by the fibers contained in the first structural portion.

In the aspect, as seen from the side facing the characteristic design surface, the orientation direction of the fibers of the first pattern portion and the orientation direction of the fibers of the second pattern portion may be configured to be directions orthogonal to one another.

According to the structure described above, because the orientation directions of the fibers of the first pattern portion and the second pattern portion are orthogonal to one another as seen from the side facing the characteristic design surface, further sense of depth is provided to the pattern seen at the side at which the characteristic design surface is disposed.

As described above, according to the resin structure of the present disclosure, the fibers contained in the resin may be utilized to provide a sense of depth to the pattern seen at the side at which the characteristic design surface side is disposed.

BRIEF DESCRIPTION OF THE DRAWINGS

An exemplary embodiment of the present disclosure will be described in detail based on the following figures, wherein:

FIG. 1 is a perspective view showing a portion of a spoiler that serves as a resin structure according to an exemplary embodiment.

DETAILED DESCRIPTION

Figure 2A:
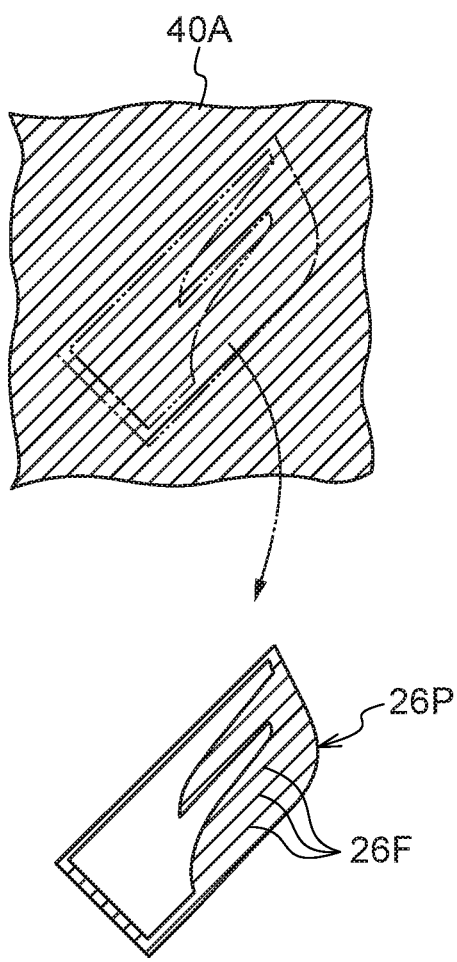
FIG. 2A is a plan view for describing earlier steps when fabricating the spoiler of FIG. 1, showing cutting of a part for a second pattern portion from a sheet.

A resin structure according to an exemplary embodiment is described using FIG. 1 to FIG. 3B. FIG. 1 shows a perspective view of a portion of a spoiler 10 that serves as the resin structure according to the exemplary embodiment. An arrow FR in FIG. 1 indicates a vehicle front side, an arrow UP indicates a vehicle upper side, and an arrow IN indicates a vehicle width direction inner side.

—Structure of Spoiler—

The spoiler 10 shown in FIG. 1 is also referred to as a rear wing spoiler, is provided at a vehicle rear portion 12 for airflow rectification, and is arranged along the vehicle width direction at an upper end portion of a back door panel 14. When seen from the vehicle upper side, a front end portion of the spoiler 10 extends in the vehicle width direction so as to run along a rear end portion of a roof panel 16, and a rear end portion of the spoiler 10 is formed so as to protrude toward the vehicle rear side. In a side face of the spoiler 10, a characteristic design surface 10S that differs in design from the surroundings thereof is provided in a central region (a predetermined region) of the spoiler 10.

The spoiler 10 includes a first structural portion 20 and a second structural portion 30 that is provided integrally with the first structural portion 20. The first structural portion 20 includes the characteristic design surface 10S and structures an end portion at a side of the spoiler 10 at which the characteristic design surface 10S is provided. The second structural portion 30 includes a region that is disposed at the opposite side of the first structural portion 20 from the side at which the characteristic design surface 10S is disposed.

The first structural portion 20 is provided with a first pattern portion 22 that structures a pattern of a mark region (a first pattern) at a central portion side of the characteristic design surface 10S. The first pattern portion 22 is formed in the shape of a predetermined mark (in this exemplary embodiment, a designed shape based on the letter "F"). The first pattern portion 22 is formed from a resin containing fibers 22F. The fibers 22F structure a portion of the pattern of the mark region (the first pattern) as seen from a side facing the characteristic design surface 10S, and are oriented in one direction (in this exemplary embodiment, a direction that is angled to the vehicle lower side toward the vehicle rear side).

The first structural portion 20 is further provided with second pattern portions 24 and 26 that structure a mark-surrounding pattern (a second pattern) at outer periphery portion sides of the characteristic design surface 10S and are disposed at the outer periphery side of the first pattern portion 22. The second pattern portion 24 is disposed at the vehicle front side of the first pattern portion 22 (the left side of the mark), and the second pattern portion 26 is arranged so as to encircle the first pattern portion 22 and the second pattern portion 24. The second pattern portions 24 and 26 are formed from resins containing fibers 24F and 26F. The fibers 24F and 26F structure portions of the mark-surrounding pattern (the second pattern) as seen from the side facing the characteristic design surface 10S. The fibers 24F and 26F are oriented in different directions from the orientation direction of the fibers 22F of the first pattern portion 22 (the one direction). Specifically, the fibers 24F are oriented in a direction that is angled to the vehicle upper side toward the vehicle rear side, and the fibers 26F are oriented along the vehicle front-and-rear direction.

In this exemplary embodiment, fibers that are employed as the fibers 22F, 24F and 26F contained in the first structural portion 20 are, for example, 3K twill fibers (that is, fibers formed by twisting 3,000 carbon fiber filaments).

The second structural portion 30 structures most of the spoiler 10. The second structural portion 30 is provided with a region 32 that is superposed with the first structural portion 20 (see the region enclosed by two-dot chain lines in the drawings) and a region 34 that is not superposed with the first structural portion 20. The region 34 of the second structural portion 30 that is not superposed with the first structural portion 20 includes a region 34X that is disposed at the outer periphery side of the first structural portion 20, and a region 34Y that is superposed with the region 34X disposed at the outer periphery side of the first structural portion 20. The surface of the region 34X of the second structural portion 30 that is disposed at the outer periphery side of the first structural portion 20 is aligned with the surface of the first structural portion 20.

The second structural portion 30 is formed form a resin containing fibers 30F with a different fiber width from the fibers 22F, 24F and 26F that are contained in the first structural portion 20. As an example, the fibers 30F are oriented in a direction that is angled to the vehicle lower side toward the vehicle rear side. In FIG. 1, in order to aid viewing of the drawing, those of the fibers 30F that can be seen from the side of the spoiler 10 at which an upper face 30U is provided are not shown in the drawing. In this exemplary embodiment, the fibers 30F contained in the second structural portion 30 are configured to have greater fiber widths than the fibers 22F, 24F and 26F contained in the first structural portion 20. The fibers that are employed as the fibers 30F contained in the second structural portion 30 are, for example, 12K twill fibers (that is, fibers formed by twisting 12,000 carbon fiber filaments).

Resins that are employed as the resin forming the first structural portion 20 and the resin forming the second structural portion 30 are materials featuring transparency to light. The portion of the fibers 30F that are contained in the region 32 superposed with the first structural portion 20 are configured so as to be visible through the resin of the first structural portion 20. In FIG. 1, in order to prevent difficulty in viewing of the drawing, the state of this portion of the fibers 30F being visible is not depicted in the drawing. Accordingly, to add to this description, the fibers 30F in linear shapes that can be seen adjacent to the outer periphery side of the first structural portion 20 extend in linear shapes at a back side (the vehicle width direction inner side) of the first structural portion 20, and are configured such that these fibers 30F at the back side of the resin of the first structural portion 20 can be seen.

—Spoiler Fabrication Method—

Now, a fabrication method of the spoiler 10 shown in FIG. 1 is described with reference to FIG. 2A to FIG. 2D and FIG. 3A to FIG. 3B.

Figure 2B:
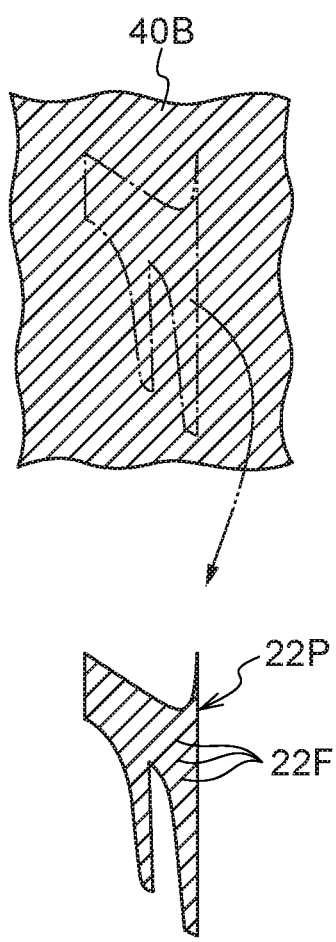
FIG. 2B is a plan view for describing the earlier steps when fabricating the spoiler of FIG. 1, showing cutting of a part for a first pattern portion (a mark region) from a sheet.
Figure 2C:
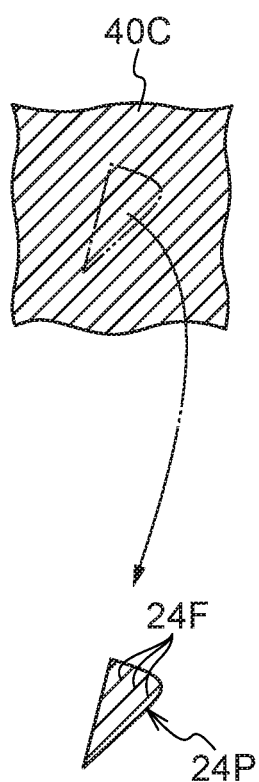
FIG. 2C is a plan view for describing the earlier steps when fabricating the spoiler of FIG. 1, showing cutting of another part for the second pattern portion from a sheet.
Figure 2D:
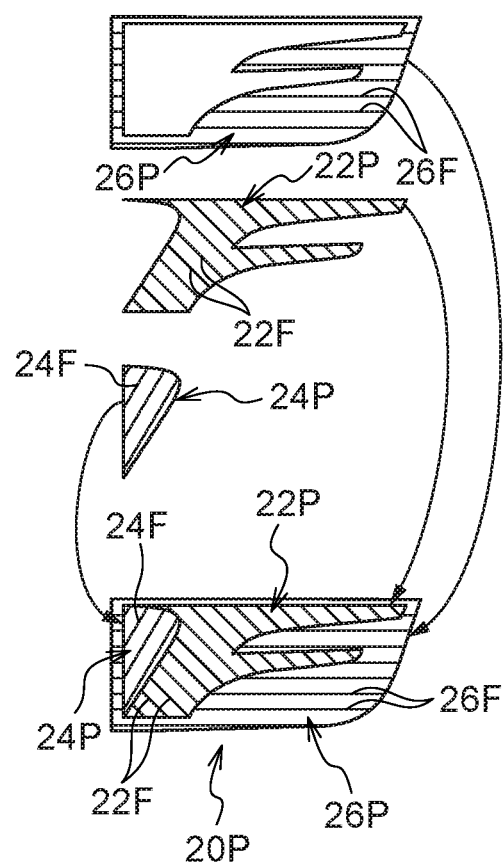
FIG. 2D is a plan view for describing the earlier steps when fabricating the spoiler of FIG. 1, showing how the cut-out parts are arranged.

First, parts 22P, 24P and 26P are cut from prepreg sheets 40A, 40B and 40C fabricated of fiber-reinforced resin, in which 3K twill fibers and thermosetting resins are combined. The parts 22P, 24P and 26P are formed in respective shapes of the first pattern portion 22 and the second pattern portions 24 and 26 (all shown in FIG. 1). The parts 22P, 24P and 26P are cut out as illustrated in FIG. 2A to 2C, with the orientation directions of the fibers 22F, 24F and 26F relative to the respective shapes matching up to orientation directions of the fibers 22F, 24F and 26F in the fabricated first structural portion 20 in a vehicle side view, as shown in FIG. 1. As shown in FIG. 2D, the three parts 22P, 24P and 26P are arranged to form an assemblage 20P that forms an original shape of the first structural portion 20 (see FIG. 1).

Further, although not shown in the drawings, plural parts 30P (see FIG. 3A and FIG. 3B) are cut out from a prepreg sheet fabricated of fiber-reinforced resin, in which 12K twill fibers and a thermosetting resin are combined. The parts 30P are for forming the second structural portion 30 (see FIG. 1). Similarly, the parts 30P are cut out as shown in FIG. 3A and FIG. 3B, with the orientation direction of the fibers 30F relative to the shape of the parts 30P, shown in FIG. 3B, matching up to the orientation direction of the fibers 30F in the fabricated second structural portion 30 in a vehicle side view, as shown in FIG. 1.

Figure 3A:
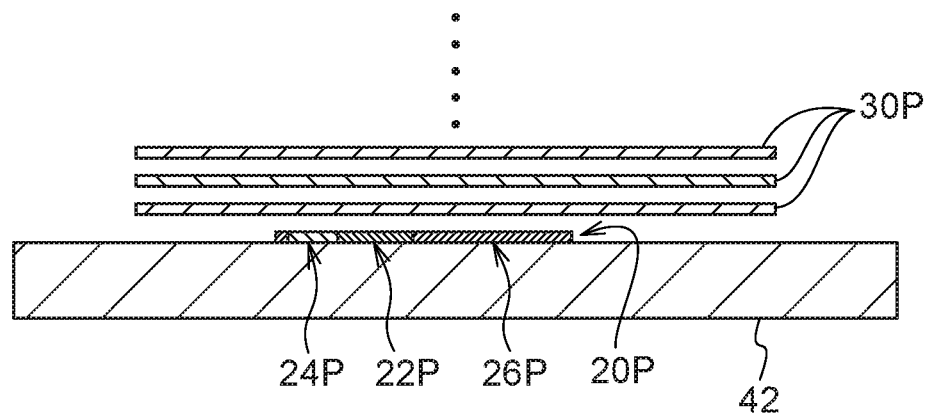
FIG. 3A is a diagram for describing later steps when fabricating the spoiler of FIG. 1, which is a vertical sectional diagram of an assemblage forming an original shape of a first structural portion, corresponding to a section along line 3A-3A of FIG. 3B.
Figure 3B:
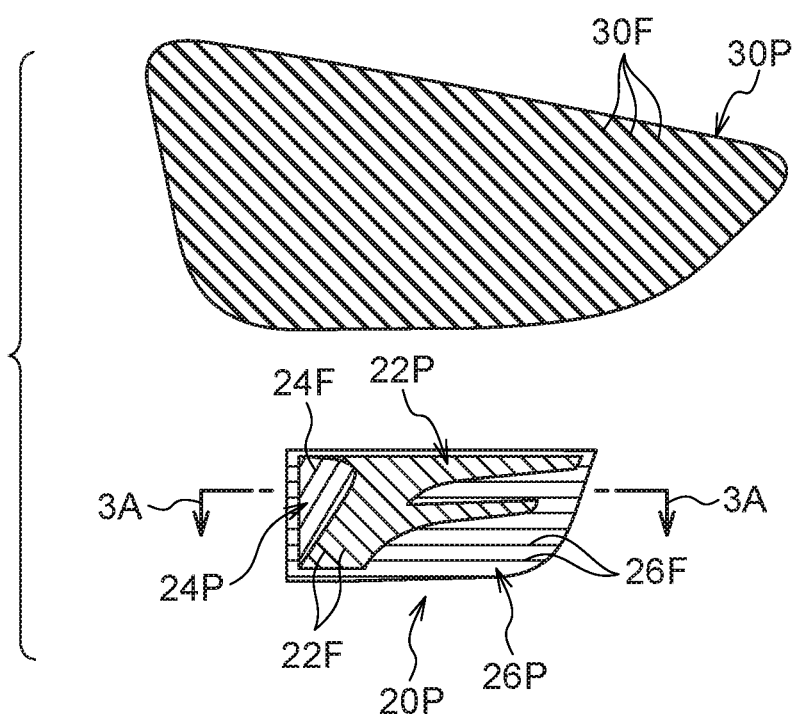
FIG. 3B is a diagram for describing the later steps when fabricating the spoiler of FIG. 1, which is a plan view showing the assemblage forming the original shape of the first structural portion and a part for forming a second structural portion.

Then, as shown in FIG. 3A, the assemblage 20P forming the original shape of the first structural portion 20 (see FIG. 1) is placed on a platen 42 (or a mold), and the plural parts 30P for forming the second structural portion 30 (see FIG. 1) are placed on the assemblage 20P from above so as to be laminated. In FIG. 3A, in order to aid viewing of the drawing, the assemblage 20P and parts 30P are depicted as being spaced apart by an appropriate spacing and the adjacent parts 30P are depicted as being spaced apart from one another by an appropriate spacing. The parts 30P are laminated in an appropriate number corresponding to the length direction of the spoiler 10. The section of the assemblage 20P shown in FIG. 3A corresponds to the section along line 3A-3A in FIG. 3B.

After the assemblage 20P and the plural parts 30P shown in FIG. 3A have been laminated, vacuum heat pressing is performed and the same are cured. Thus, bonding and setting of the parts 22P, 24P, 26P and 30P is implemented. The spoiler 10 illustrated in FIG. 1 is provided by the above steps.

Obviously, the number of layers of the parts when the resin structure is being fabricated will vary with the size of the resin structure that is to be fabricated.

—Operation and Effects—

Now, operation and effects of the above exemplary embodiment are described.

As shown in FIG. 1, in the first structural portion 20 that includes the characteristic design surface 10S and structures the end portion at the side of the spoiler 10 at which the characteristic design surface 10S is provided, the orientation direction of the fibers 22F in the first pattern portion 22 differs from the orientation directions of the fibers 24F and 26F in the second pattern portions 24 and 26, and these fibers 22F, 24F and 26F structure portions of the pattern. The fibers 30F contained in the second structural portion 30, which includes the region that is disposed at the opposite side of the first structural portion 20 from the side at which the characteristic design surface 10S is provided, have a different fiber width from the fibers 22F, 24F and 26F contained in the first structural portion 20. The portion of the fibers 30F that are contained in the region 32 of the second structural portion 30 that is superposed with the first structural portion 20 are configured so as to be visible through the resin of the first structural portion 20. Therefore, a sense of depth is provided to the pattern seen at the side at which the characteristic design surface 10S is disposed, and a pattern with a greater feeling of substance may be presented.

As described above, according to the spoiler 10 that serves as the resin structure of this exemplary embodiment, the fibers 22F, 24F, 26F and 30F contained in the resin may be utilized to provide a sense of depth to a pattern seen at the side at which the characteristic design surface 10S is disposed. In this exemplary embodiment, the first pattern portion 22 formed in the mark shape may seem to be floating and appear attractive. Thus, product appeal of the spoiler 10 is improved.

In a side face of the spoiler 10 of this exemplary embodiment, no protrusions and indentations are formed as in, for example, a comparative structure in which a separate mark region is subsequently applied using metal plating, resin or the like. Thus, the side face of the spoiler 10 is flat, which is advantageous in regard to aerodynamic performance compared to the comparative structure. In this exemplary embodiment, the fibers 22F, 24F and 26F are contained in the first structural portion 20 structuring the characteristic design surface 10S, which is advantageous from the aspect of rigidity compared to, for example, a structure in which the separate mark region of the comparative structure does not contain fibers.

In this exemplary embodiment, subsequent application as in the comparative structure is not necessary, and the mark region may be included and integrally formed in the spoiler 10. Therefore, costs may be reduced.

In this exemplary embodiment, the fibers 30F contained in the second structural portion 30 are configured to have a greater fiber width than the fibers 22F, 24F and 26F contained in the first structural portion 20. Therefore, stiffness of the spoiler 10 may be raised further by the fibers 30F contained in the second structural portion 30 while a finely detailed pattern is presented by the fibers 22F, 24F and 26F contained in the first structural portion 20.

Variant Examples of the Exemplary Embodiment

Figure 4:
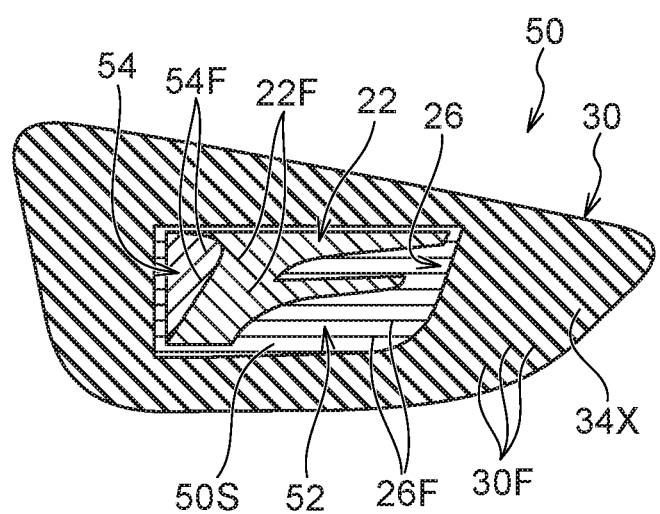
FIG. 4 is a side diagram showing a side view of a spoiler that serves as a resin structure according to a variant example.

Now, a variant example of the above exemplary embodiment is described with reference to FIG. 4. FIG. 4 shows a side face of a spoiler 50 that serves as a resin structure according to the variant example. A characteristic design surface 50S that differs in design from the surroundings thereof is provided at a side face of the spoiler 50, in a central region (a predetermined region) of the side face. The variant example differs from the above exemplary embodiment in that a second pattern portion 54 is provided in place of the second pattern portion 24 according to the exemplary embodiment (illustrated in FIG. 1). An orientation direction of fibers 54F contained in the second pattern portion 54 according to the variant example is a little different from the orientation direction of the fibers 24F contained in the second pattern portion 24 according to the above exemplary embodiment shown in FIG. 1. The second pattern portion 54 shown in FIG. 4 and the second pattern portion 24 according to the exemplary embodiment (FIG. 1) have similar structures in other respects. In the variant example, a first structural portion 52 provided with the first pattern portion 22 and with the second pattern portions 26 and 54 has a similar structure to the first structural portion 20 according to the exemplary embodiment (FIG. 1) except in the respects mentioned above.

Below, structural portions that are substantially the same as in the above exemplary embodiment shown in FIG. 1 are assigned the same reference numerals and are not described. In FIG. 4, in order to prevent difficulty in viewing of the drawing, similarly to FIG. 1, the state of a portion of the fibers 30F being visible through the resin of the first structural portion 52 is not depicted in the drawing.

As shown in FIG. 4, as seen from the side facing the characteristic design surface 50S, the orientation direction of the fibers 22F of the first pattern portion 22 and the orientation direction of the fibers 54F of the second pattern portion 54 are configured to be directions that are orthogonal to one another. Therefore, in this variant example, further sense of depth is provided to the pattern seen at the side at which the characteristic design surface 50S is disposed, and the left side of the first pattern portion 22 in the drawing seems to be floating further (in other words, the pattern appears three-dimensional).

Supplementary Descriptions of the Exemplary Embodiment

In the exemplary embodiment and variant example shown in FIG. 1 and FIG. 4, carbon fibers are employed as reinforcing fibers contained in the resins. However, various publicly known fibers may be employed instead of carbon fibers such as, for example, resin fibers such as aramid fibers, cellulose fibers, nylon fibers, vinylon fibers, polyester fibers, polyolefin fibers, rayon fibers and the like, and glass fibers, metal fibers and so forth.

In the exemplary embodiment and variant example shown in FIG. 1 and FIG. 4, the resins forming the spoilers 10 and 50 are thermosetting resins. However, the disclosure is not limited thereto and a resin forming the resin structure may be a thermoplastic resin.

In the exemplary embodiment and variant example shown in FIG. 1 and FIG. 4, the resin structure is the spoiler 10 or 50. However, the disclosure is not limited thereto and the resin structure may be employed at an alternative member such as, for example, a vehicle roof panel, hood panel, fender panel, door panel, side outer panel or the like.

In the exemplary embodiment and variant example shown in FIG. 1 and FIG. 4, 3K twill fibers are employed as the fibers 22F, 24F, 26F and 54F contained in the first structural portions 20 and 52. However, fibers contained in the first structural portion are not limited to these fibers.

In the exemplary embodiment and variant example shown in FIG. 1 and FIG. 4, the fibers 30F contained in the second structural portion 30 are configured to have greater fiber widths than the fibers 22F, 24F, 26F and 54F contained in the first structural portions 20 and 52. Although this structure is more preferable, a structure may be employed in which the fibers contained in the second structural portion are configured to have smaller fiber widths than the fibers contained in the first structural portion.

In the exemplary embodiment and variant example shown in FIG. 1 and FIG. 4, plural numbers of the second pattern portions 24, 26 and 54 are provided. However, the disclosure is not limited thereto and a single second pattern portion may be provided rather than plural second pattern portions.

In the above exemplary embodiment, the parts 30P shown in FIG. 3A are laminated in an appropriate number to fabricate the spoiler 10 shown in FIG. 1. However, the disclosure is not limited thereto. For example, a mode may be employed such that one layer each of an assemblage of sheet-shaped parts for forming the first structural portion and a sheet-shaped part for forming the second structural portion are laminated to fabricate a sheet-shaped resin structure, and this sheet-shaped resin structure is adhered to another component of a vehicle or the like.

The exemplary embodiment described above and variant examples mentioned above may be embodied in suitable combinations.

Hereabove, examples of the present disclosure have been described. The present disclosure is not limited by these descriptions and it will be clear that numerous modifications beyond these descriptions may be embodied within a technical scope not departing from the gist of the disclosure.

What is claimed is:

1. A resin structure comprising:
a first structural portion that includes a characteristic design surface and structures an end portion at a side of the resin structure at which the characteristic design surface is disposed, the characteristic design surface being provided in a predetermined region and differing in design from surroundings thereof; and
a second structural portion that is provided integrally with the first structural portion and includes a region disposed at the opposite side of the first structural portion from the side thereof at which the characteristic design surface is disposed,
wherein the first structural portion includes:
a first pattern portion that structures a first pattern at a center side of the characteristic design surface and that is formed from a resin containing fibers that structure a portion of the first pattern as seen from a side facing the characteristic design surface and are oriented in a first direction; and
a second pattern portion that structures a second pattern at an outer periphery side of the characteristic design surface and that is disposed at the outer periphery side of the first pattern portion, the second pattern portion being formed from a resin containing fibers that structure a portion of the second pattern as seen from the side facing the characteristic design surface and are oriented in a second direction different from the first direction,
and the second structural portion is formed from a resin containing fibers with a different fiber width from the fibers contained in the first structural portion, a portion of the fibers contained in a region of the second structural portion that is superposed with the first structural portion being configured so as to be visible through the resin of the first structural portion.

2. The resin structure according to claim 1, wherein the fibers contained in the second structural portion have a greater fiber width than the fibers contained in the first structural portion.

3. The resin structure according to claim 1, wherein, as seen from the side facing the characteristic design surface, the orientation direction of the fibers of the first pattern portion and the orientation direction of the fibers of the second pattern portion are configured to be directions orthogonal to one another.

* * * * *